United States Patent
Silvestri et al.

(10) Patent No.: US 9,971,972 B2
(45) Date of Patent: May 15, 2018

(54) PREDICTING THE NEXT APPLICATION THAT YOU ARE GOING TO USE ON AVIATE

(71) Applicant: Yahoo! Inc., Sunnyvale, CA (US)

(72) Inventors: Fabrizio Silvestri, Barcelona (ES); Ricardo Baeza-Yates, Barcelona (ES); Beverly Harrison, Palo Alto, CA (US); Di Jiang, Hong Kong (HK)

(73) Assignee: Oath Inc., New York, NY (US)

( * ) Notice: Subject to any disclaimer, the term of this patent is extended or adjusted under 35 U.S.C. 154(b) by 549 days.

(21) Appl. No.: 14/586,635

(22) Filed: Dec. 30, 2014

(65) Prior Publication Data
US 2016/0189049 A1    Jun. 30, 2016

(51) Int. Cl.
| H04M 3/00 | (2006.01) |
| G06N 99/00 | (2010.01) |
| H04L 29/08 | (2006.01) |
| H04W 4/02 | (2018.01) |
| H04W 4/20 | (2018.01) |

(52) U.S. Cl.
CPC ........... *G06N 99/005* (2013.01); *H04L 67/22* (2013.01); *H04W 4/028* (2013.01); *H04W 4/20* (2013.01)

(58) Field of Classification Search
CPC ...... G06N 99/005; H04W 4/20; H04W 4/028; H04L 67/22
USPC ....................................................... 455/418
See application file for complete search history.

(56) References Cited

U.S. PATENT DOCUMENTS

| 9,032,321 | B1* | 5/2015 | Cohen | G06F 3/0484 715/771 |
| 2011/0072492 | A1* | 3/2011 | Mohler | G06F 3/04817 726/3 |
| 2013/0187753 | A1* | 7/2013 | Chiriyankandath | G06F 3/0488 340/5.51 |

FOREIGN PATENT DOCUMENTS

WO    2013/184383    12/2013

OTHER PUBLICATIONS

Box, George E.P. et al., "Bayesian inference in statistical analysis," John Wiley and Sons, Inc., 1992.
Eppstein, David, "Spanning trees and spanners," Handbook of Computational Geometry, May 8, 1996.
Friedman, N. et al., "Bayesian network classifiers," Machine Learning, 29, 131-163 (1997).

(Continued)

Primary Examiner — Amancio Gonzalez
(74) *Attorney, Agent, or Firm* — Weaver Austin Villeneuve & Sampson LLP

(57) ABSTRACT

In one embodiment, a current context of a mobile device may be ascertained, where the current context includes an indication of a last application opened via the mobile device, wherein the last application opened is one of a plurality of applications installed on the mobile device. A probability, for each of the plurality of applications, that a user of the mobile device will use the corresponding application under the current context may be determined, where the probability for at least a portion of the plurality of applications is determined by applying a computer-generated model to the current context, wherein the computer-generated model is associated with the mobile device. One or more of the plurality of the applications may be identified based, at least in part, upon the probability, for each one of the plurality of (Continued)

applications, that the user of the mobile device will use the corresponding application.

20 Claims, 9 Drawing Sheets

(56) References Cited

OTHER PUBLICATIONS

Gower, J.C. et al. "Minimum spanning trees and single linkage cluster analysis," Journal of the Royal Statistical Society, Series C (applied statistics) vol. 18, No. 1 (1969) pp. 54-64.
Henze, N. et al., "My app is an experiment: experience from user studies in mobile app stores," International Journal of Mobile Human Computer Interaction (IJMHCI) 3 (2011) No. 4, 71-91.
Huang, K. et al., "Predicting mobile application usage using contextual information," Proceedings of the 2012 ACM Conference on Ubiquitous Computing, Sep. 2012.
Jiang, D. et al., "Panorama: a semantic-aware application search framework," Proceedings of the 16th International Conference on Extending Database Technology, ACM, Mar. 2013.
Krishnaswamy, S. et al., Mobile data stream mining: from algorithms to applications, Mobile Data Management (MDM), IEEE 14th International Conference on Mobile Data Management, 2012 (abstract).
Liao, Zhung-Xun et al., "Mining temporal profiles of mobile applications for usage prediction," (ICDMW), IEEE 13th International Conference on Data Mining, 2012 (abstract).
Lin, J. et al., "Addressing cold-start in app recommendation: latent user models constructed from twitter followers," Proceedings of the 36th International ACM SIGIR Conference on Research and Development in Information Retrieval, ACM, Jul. 2013.
Lin, J. et al., "New and improved: modeling versions to improve app recommendation," Proceedings of the 37th International ACM SIGIR Conference on Research & Development in Information Retrieval, ACM, Oct. 2014.
Mikolov, T. et al., "Distributed representations of words and phrases and their compositionality," Advances in Neural Information Processing Systems, 2013.
Pan, W. et al., "Composite social network for predicting mobile apps installation," Association for the Advancement of Artificial Intelligence, 2011.
Parate, A. et al., "Practical prediction and prefetch for faster access to applications on mobile phones," Proceedings of the 2013 ACM International Joint Conference on Pervasive and Ubiquitous Computing, ACM, Sep. 2013.
Premaratne, G. et al., "Modeling asymmetry and excess kurtosis in stock return data," Illinois Research & Reference Working Paper No. 00-123 (2000).
Tan, C. et al., "Prediction for mobile application usage patterns," Nokia MDC workshop, vol. 12, 2012.
Xing, K. et al., "ADI: towards a framework of app developer inspection," Database Systems for Advanced Applications, Apr. 2014.
Yan, T. et al., "Fast app launching for mobile devices using predictive user context," Proceedings of the 10th International Conference on Mobile Systems, Applications and Services, ACM, Jun. 2012.
Yin, P. et al., "App recommendation: a contest between satisfaction and temptation," Proceedings of the 6th ACM International Conference on Web Search and Data Mining, Feb. 2013 (abstract).
Zou, X. et al., "Prophet: what app you wish to use next," Proceedings of the 2013 ACM Conference on Pervasive and Ubiquitous Computing, Sep. 2013.

* cited by examiner

TAN Structure Learning Mapper

1: for each app action entry {u; a; f1; f2; f3; :::; fn} do
2: for each feature pair (fi; fj ) do
3: Emit(key={fi; fj ; a},value=1);
4: Emit(key={fi; a},value=1);
5: Emit(key={fj ; a},value=1);
6: end for
7: end for

FIG. 4

TAN Parameter Learning Mapper

1: for each action long entry {u; c; a1; a2; a3; :::; an} do
2: for each feature pair ai do
3: Emit(key=ai; pa(ai),value=1);
4: Emit(key=pa(ai),value=1);
5: end for
6: end for

FIG. 5

PREDICTING THE NEXT APPLICATION THAT YOU ARE GOING TO USE ON AVIATE

BACKGROUND OF THE INVENTION

The disclosed embodiments relate generally to computer-implemented methods and apparatus for managing applications.

Mobile applications are becoming ubiquitous due to the increasing popularity of mobile devices such as smartphones and tablets. Due to an increasing availability and usage of mobile applications, mobile devices often have a very large number of applications installed. Given the limited screen size of mobile devices, it is often tedious for users to search for an application they want to use through a potentially very large collection of installed applications.

To find applications that are used often, a user may manually organize their applications on their mobile device. For example, frequently used applications may be placed on a homescreen.

SUMMARY OF THE INVENTION

The disclosed embodiments provide a personalized application prediction system. In one embodiment, a current context of a mobile device may be ascertained, where the current context includes an indication of a last application opened via the mobile device, wherein the last application opened is one of a plurality of applications installed on the mobile device. A probability, for each of the plurality of applications, that a user of the mobile device will use the corresponding application under the current context may be determined, where the probability for at least a portion of the plurality of applications is determined by applying a computer-generated model to the current context, wherein the computer-generated model is associated with the mobile device. One or more of the plurality of the applications may be identified based, at least in part, upon the probability, for each one of the plurality of applications, that the user of the mobile device will use the corresponding application.

In another embodiment, it may be ascertained whether a threshold amount of contextual information pertaining to usage of at least a portion of a plurality of applications installed on a mobile device is available, where the contextual information includes a context pertaining to one or more actions detected via the mobile device. A probability, for each of the plurality of applications, that a user of the mobile device will use the corresponding application under a current context may be determined, based, at least in part, upon whether a threshold amount of contextual information pertaining to usage of at least a portion of the plurality of applications installed on the mobile device is available. One or more of the plurality of the applications may be identified based, at least in part, upon the ascertained probability, for each one of the plurality of applications, that the user of the mobile device will use the corresponding application.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 4 is a diagram illustrating an example algorithm for implementing a TAN structure learning mapper in accordance with various embodiments.

FIG. 5 is a diagram illustrating an example TAN parameter learning mapper in accordance with various embodiments.

DETAILED DESCRIPTION OF THE SPECIFIC EMBODIMENTS

Figure 1:
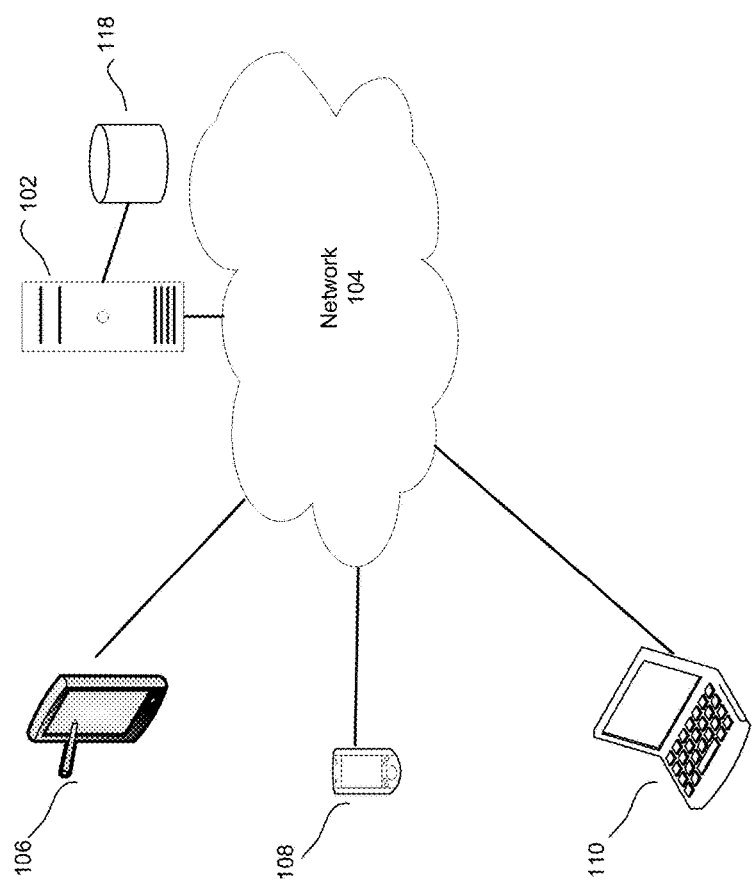
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Example System

FIG. 1 is a diagram illustrating an example system in which various embodiments may be implemented. As shown in FIG. 1, the system may include one or more servers 102, which may be associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, the server(s) 102 may include a web server, search server, and/or content server.

A plurality of clients 106, 108, 110 may access a web service on a web server via a network 104. The network 104 may take any suitable form, such as a wide area network or Internet and/or one or more local area networks (LAN's). The network 104 may include any suitable number and type of devices, e.g., routers and switches, for forwarding search or web object requests from each client to a search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a standalone computing device, or according to a distributed computing model in which various of the functionalities described herein may be effected or employed at different locations.

In accordance with various embodiments, the clients 106, 108, 110 may install applications from server(s) via the network 104. In addition, the clients 106, 108, 110 may open or otherwise access applications installed on the clients 106, 108, 110. Each of the clients 106, 108, 110 may include a mobile device. An example client device will be described in further detail below.

As will be described in further detail below, a personalized application prediction system may leverage a context that is continuously sensed by a mobile device. More particularly, the context may indicate a sequence of real-time actions that are sensed via the mobile device. Such actions may include those initiated by the user directly (e.g., by opening an application), as well as those that are initiated by the user indirectly (e.g., by driving or walking with the mobile device).

A personalized application prediction system may be implemented via any of the clients 106, 108, 110 and/or remotely located server(s) 102. As will be described in further detail below, a list of applications installed on a mobile device may be identified. Given a current context C, one or more of the applications that a user of the mobile device has a high probability of using may be identified. This may be accomplished by applying a prediction model to predict the application(s) that are most likely to be used next or in the immediate future by a user of the mobile device under a particular context C. In this manner, it is possible to anticipate application(s) that a user of the mobile device is likely to use even before the user clicks on an icon of the application on his or her mobile device.

Once identified, at least one of the identified applications may be launched and/or recommended to the user via the mobile device. Furthermore, an advertisement for at least one of the identified application(s) may be presented to the user.

A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

An advertisement may include text, one or more images, video, and/or audio. An advertisement may also include one or more hypertext links, enabling a user to proceed with the purchase of a particular product or service via the Internet.

Personalized application prediction may be performed based, at least in part, upon a context associated with a particular mobile device, as will be described in further detail below. More particularly, personalized application prediction for a given mobile node may be performed using a prediction model associated with the mobile node. Where the context of the mobile device is unavailable or otherwise limited, personalized application prediction may be performed based, at least in part, upon information associated with a set of other mobile devices that do not include the mobile device. Such information may include historical data and/or information derived via a prediction model associated with at least one of the other mobile devices. In some embodiments, personalized application prediction may be performed using information from a user profile of a user of the mobile device.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user and/or applications that have been selected.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

In accordance with various embodiments, a user profile may be associated with one or more client devices, which may include one or more mobile devices. Conversely, each client device may be associated with a set of one or more users, enabling user profile(s) associated with the client device to be identified.

Each mobile device may also have an associated device profile. The device profile may include a current context, as will be described in further detail below. The device profile may also identify all applications installed on the mobile device. In addition, the device profile may further include historical data that may be used to train an application prediction model. In some embodiments, the device profile may further include parameter values associated with the prediction model.

A device profile of a mobile node may be stored locally on a mobile device and/or remotely at a remotely located server. In addition, a device profile or information from a device profile may be transmitted or otherwise shared between a mobile device and the remotely located server. Thus, the server may have access to a plurality of device profiles associated with a plurality of mobile devices. Therefore, the server may identify a class of mobile devices sharing a set of characteristics with a given mobile device based upon their corresponding device profiles and/or user profiles.

One of the major issues associated with the large number of applications installed on many mobile devices is that of their visibility. More particularly, when a user wishes to use a particular application, it is not always available immediately and the search through the large number of installed applications might take a significant amount of time. As a result, homescreen applications are increasing in popularity.

Figure 2:
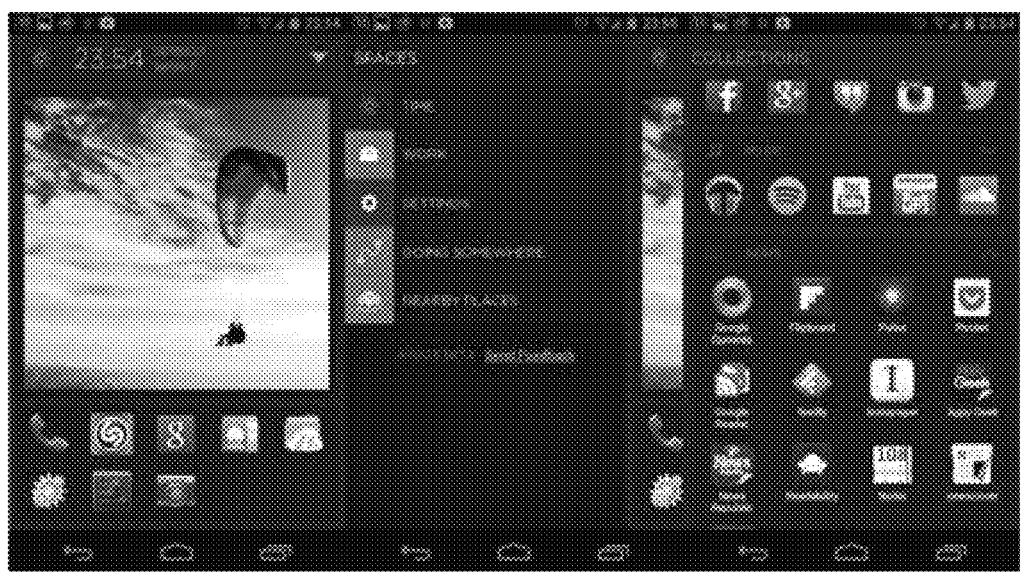
FIG. 2 is a graphical user interface illustrating an example homescreen that may be implemented in accordance with various embodiments.

A homescreen application may act as an intelligent layer between an underlying mobile operating system of a mobile device and a user interface of the mobile device. The homescreen application may manage the installed apps in a highly personalized manner rather than simply relying on manual (or trivial) categorization schemes. In accordance with one embodiment, the personalized application prediction system may be implemented, at least in part, via a homescreen application of the mobile device. A graphical user interface illustrating an example homescreen that may be implemented is shown in FIG. 2.

Embodiments disclosed herein may be implemented via remotely located server(s) and/or the clients. For example, various features may be implemented via a homescreen application installed on the clients. The disclosed embodiments may be implemented via software and/or hardware.

Application Prediction Problem

An application prediction problem may be formally defined as follows:

Given a list of applications {au1; au2; : : : ; aun} installed on a mobile device of a user u and the user's context C, the problem of application usage prediction is to find at least one application $a_{ui}$, that has the largest probability of being used under the user's context C. Specifically, we aim to solve the problem: Max $a_{ui}P(a_{ui}|C, u)$, $\forall i$, $1 \leq i \leq n$.

Features Used to Solve the Application Prediction Problem

Various features may be used to solve the application prediction problem. Such features may include signal features that may be directly obtained from sensors of a mobile device. In addition, the features may include distributed features, which may indicate sequential patterns with respect to application usage. Examples of signal features and distributed features will be described in further detail below.

Signal Features

The signal features may be obtained automatically by the mobile device without initiation by a user. The signal features may define the user's spatiotemporal context.

In accordance with various embodiments, the signal features may include time, latitude, longitude, speed, Global Positioning System (GPS) accuracy, context trigger, context pulled, charge cable, and/or audio cable. The time feature may indicate a current time, whether the time is in the morning or evening, a day of the week, and/or a specific date. In one embodiment, the time feature may be normalized between 00:00:00-23:59:59 to capture daily application usage patterns. The latitude feature and longitude feature may specify the latitude and longitude of the mobile device ascertained via a GPS system, while the speed feature may indicate the speed with which the mobile device is traveling. The GPS accuracy feature may indicate an accuracy (or percent error) of the latitude and longitude features.

The charge cable feature may indicate whether a charge cable is plugged into the mobile device. Similarly, the audio cable feature may indicate whether an audio cable is plugged into the mobile device.

The context trigger feature may indicate a context of the user. For example, the context trigger feature may indicate that the user is at work or at home. Similarly, the context pulled feature may indicate whether the user has explicitly switched the context in which the user operates. More particularly, the user may define a context or select one of a plurality of contexts in which the user would like to operate. By defining a context, the user may add a new context to one of the plurality of contexts. As a result, the plurality of contexts that are possible may be unique to a specific mobile device. Example contexts that may be selectable by a user include home, work, morning, evening, "start of day," "I'm with my kids," and "I'm at the airport."

One or more of the signal features may be used separately, or in combination with one another, to represent the user's context in relation to usage by the user of applications installed on the user's mobile device. More particularly, one or more of the signal features may be used to represent the user's context in relation to an application action such as an application open event with respect to an application installed on the user's mobile device.

Distributed Features

One or more distributed features may capture contextual information pertaining to (e.g., surrounding) application actions such as application open actions. Thus, the contextual information may pertain to usage of applications installed on a mobile device. More particularly, a distributed feature may indicate a sequential pattern of actions occurring prior to and/or after an application action. In one embodiment, the application actions may include an application open action, a location update action, a charge cable action, an audio cable action, a context trigger action, and/or a context pulled action A location update action may indicate that the location of the mobile device has been updated. For example, it may be ascertained that the location of the mobile device has been updated based, at least in part, upon GPS information such as latitude, longitude, and/or accuracy indicating that the location of the mobile device has changed.

Usage of an application may be ascertained via an application open action that has been detected. More particularly, an application open action may indicate an action of a user of the mobile device to open a corresponding application. An application open action with respect to a first application (e.g., Application A) may be considered distinct from an application open action with respect to a second application (e.g., Application B).

A record of application actions detected via a mobile device may be maintained on the mobile device. For example, the record of the application actions may be maintained by a homescreen application installed on the mobile device. In addition, a record of the application actions detected via a mobile device may be maintained on a remotely located server. Thus, a remotely located server may maintain a record of the application actions for a plurality of mobile devices (e.g., in their respective device profiles).

In accordance with various embodiments, a timestamp is recorded in association with each of the actions detected via a mobile device. As a result, it is possible to identify a context of each of the recorded actions. The context of an action may be defined as a sequence of actions that are conducted before and/or after the action within a particular time period of the action.

A Gaussian based method may be applied to identify the context of a recorded action such as an application open action. More particularly, the context may be determined by sampling data within a time span such that a subset of data before and/or after the action is selected. Based on the sampled data, it is possible to identify one or more other actions that occur before and/or after the action.

For example, the context of App Open:com.android.dialer may be determined by sampling data within a time span from an empirically defined Gaussian distribution. Based on the sampled time span, we can regard the app actions App Open:com.skype.raider and Location Update: (37.393093, −122.079788, 20.000000, 0.000000) as the context of the action App Open:com.android.dialer.

In accordance with various embodiments, the context of an action may be represented by a corresponding distributed representation. More particularly, distributed representations may be generated for predicting actions surrounding an application action such as an application open action for a particular application. Distributed representations for application actions may be generated using historical data associated with the corresponding mobile device.

Distributed features may be extracted by considering sequential relationships among application actions. More particularly, a distributed representation associated with an application action may indicate a sequential pattern of actions occurring prior to the action within a particular time period and/or after the action within a particular time period.

It is desirable to find distributed representations that are useful for predicting occurrence of actions. More formally, given an action τ such as an application open action and its context $C_\tau$, the objective is to maximize the average log probability:

$$\frac{1}{T}\sum_{t=1}^{T} \sum_{\tau' \in C_\tau} \log p(\tau' \mid \tau_t),$$

where $C_\tau$ is the context of τ and T is the number of distinct actions. The probability $p(\tau'|\tau_t)$ is calculated as follows:

$$p(\tau' \mid \tau_t) = \frac{e^{V_\tau, V_{\tau_t}}}{\sum_{\tau}^{T} e^{V_\tau V_{\tau_t}}}$$

where $V_\tau$ is the distributed representation of τ and $V_{T\tau}$ is the distributed representation of $\tau_t$.

In order to enhance the efficiency, the probability may be approximated by performing a hierarchical softmax, as disclosed in Tomas Mikolov, Ilya Sutskever, Kai Chen, Greg S Corrado, and Jeff Dean, *Distributed representations of words and phrases and their compositionality*, Advances in Neural Information Processing Systems, 2013, pp. 3111-3119, which is incorporated herein by reference. More particularly, the hierarchical softmax may implement a binary tree representation with the T actions as its leaves and, for each node, explicitly represent the relative probabilities of its child nodes. A random walk may be performed that assigns probabilities to actions.

In order to efficiently compute the distributed representations of the actions, a MapReduce paradigm may be employed to parallelize the process. More particularly, a MapReduce procedure may return updated feature vectors that represent the distributed representations of the actions. An example MapReduce procedure will be described in further detail below.

Figure 3:
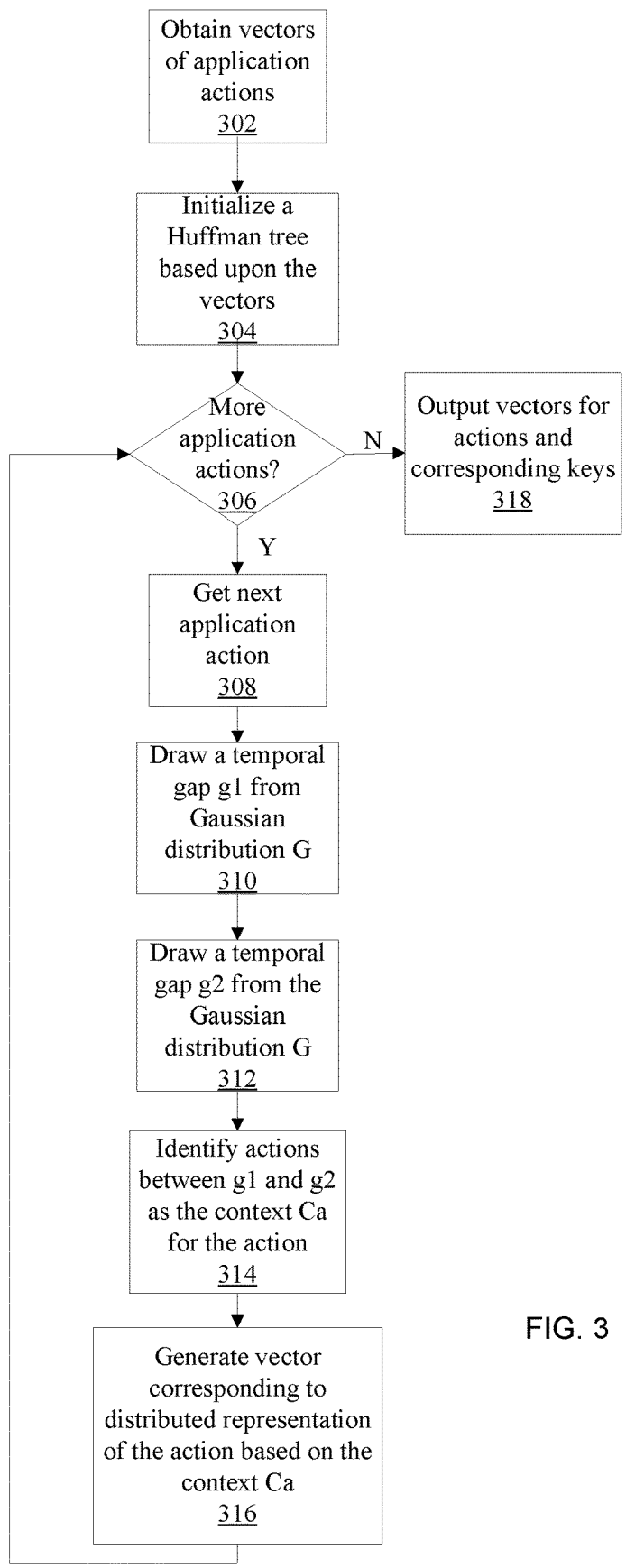
FIG. 3 is a process flow diagram illustrating an example method of implementing a mapper for use in generating distributed representations of actions in accordance with various embodiments.

FIG. 3 is a process flow diagram illustrating an example method of implementing a mapper for use in generating distributed representations of actions in accordance with various embodiments. As shown at 302, data associated with application actions that have been recorded for the mobile device may be obtained. As described above, such data may be represented in the form of vectors. A Huffman tree may be initialized based upon the data (e.g., vectors) at 304. If there are more application actions that remain to be processed at 306, the data associated with the next application action may be obtained at 308. A temporal gap g1 from a Gaussian distribution G may be drawn at 310. More particularly, the temporal gap g1 may correspond to a period of time immediately prior to the application action. In addition, a temporal gap g2 from the Gaussian distribution G may be drawn at 312. More particularly, the temporal gap g2 may correspond to a period of time immediately after the application action. Actions within the temporal gap g1 and the temporal gap g2 may be identified as the context Ca for the action at 314. A distributed representation of the action may be generated based, at least in part, on the context Ca at 316. For example, the distributed representation may be generated in the form of a vector. This process may be repeated at 206 until no further actions remain to be processed.

Vectors corresponding to distributed representations of the actions may be output at 218. More particularly, the vectors corresponding to the distributed representations of the actions may be output in association with corresponding keys at 318. For example, a key may correspond to a type of the action (e.g., Application Open for a particular application installed on the mobile device, Location Update, Charge Cable, Audio Cable, Context Trigger, Context Pulled) and a sequential pattern of actions identified within the context Ca.

A reducer may calculate an average of the vectors (e.g., for each action type or subset thereof) and normalize the resulting vectors. The reducer may operate in parallel with the mapper described above.

The distributed representation of each action may be generated based, at least in part, on the corresponding context Ca using an algorithm that has been trained to identify sequential patterns in the data and/or ascertain a distribution of the data. More particularly, by identifying sequential patterns within the data and a distribution of the patterns over time, it is possible to assign a probability of occurrence to each of the patterns with respect to a corresponding action. Such an algorithm may be trained using a first subset of data points and tested using a second subset of the data points, where each of the data points includes an action and corresponding context.

A distributed representation may identify a pattern of actions surrounding an action, where the pattern of actions identifies one or more actions occurring prior to the action within a particular period of time and/or one or more actions occurring after the action within a particular period of time. The pattern may indicate an order of the actions occurring prior to the action with respect to one another, an order of the actions occurring after the action with respect to one another, and/or an order of the actions occurring both prior to the action and after the action with respect to one another. In addition, the pattern may also indicate an amount of time that has lapsed between any of the actions occurring prior to the action, an amount of time that has lapsed between any of the actions occurring after the action, and/or an amount of time that has lapsed between any of the actions occurring both prior to the action and after the action with respect to one another. The distributed representation may include the action or otherwise be associated with the action. The distributed representation may further indicate a probability, for that mobile device, of occurrence of the pattern of actions in relation to the action. The distributed representation may be represented via a vector or other suitable data structure.

Distributed representations of one or more application actions may be defined as the distributed portion of the context. The application actions may include an Application Open action for an application installed on a mobile device. In addition, the application actions may further include at least one of a Location Update, Charge Cable, Audio Cable, Context Trigger, and/or Context Pulled. In one embodiment, distributed representations of the following six application actions may be defined as the distributed portion of the context: Last Application Opened, Last Location Update, Last Charge Cable, Last Audio Cable, Last Context Trigger, Last Context Pulled.

The distributed representations for a mobile device may be generated by the mobile device and/or remotely located server. The resulting distributed representations may be transmitted between the mobile device and remotely located server. As a result, the distributed representations may be stored at the mobile device and/or at a remotely located server. Therefore, a remotely located server may store the distributed representations for a plurality of mobile devices (e.g., in their respective device profiles).

A prediction model may be applied to distributed representations associated with one or more distributed features to identify one or more applications that are most likely to be used by a user of a mobile device. Mechanisms for generating a prediction model will be described in further detail below.

Generating a Prediction Model Associated with a Mobile Device

A prediction model may be used to determine, under a current context, the application(s) that the user of a mobile device is most likely to use next. More particularly, a distributed portion of the current context may include distributed representations of one or more application actions. The application actions used to represent the distributed portion of the context may include a Last Application Opened. In addition, the application actions used to represent the distributed portion of the current context may further include a Last Location Update, Last Charge Cable, Last Audio Cable, Last Context Trigger, and/or Last Context Pulled. In one embodiment, the application actions used to represent the distributed portion of the context may include a Last Location Update, Last Charge Cable, Last Audio Cable, Last Context Trigger, a Last Context Pulled, and a Last Application Opened. Accordingly, the distributed representations of the application actions may be used as the features for application prediction.

In accordance with various embodiments, a prediction model for a mobile device may be generated using data that identifies actions and includes associated distributed representations, where each of the distributed representations corresponds to one of the actions. More particularly, the prediction model may be trained using a first subset of the data and tested using a second subset of the data to ensure that the trained prediction model accurately predicts the application(s) that have a high probability of being used (e.g., launched) next by a user of the mobile device under a given context. The prediction model may be trained to identify patterns in the data before occurrence of the corresponding the actions and/or after occurrence of the corresponding actions, enabling the prediction model to predict the application(s) that are likely to be used next by a user of the mobile device under a given context.

Training data used to train the prediction model may include distributed representations associated with a single mobile device, which may have one or more associated users. In some instances, the training data used to train the prediction model may include the distributed representations associated with a plurality of mobile devices. Each one of the plurality of mobile devices may be associated with a corresponding set of one or more users. The plurality of mobile devices may have applications installed thereon that include the same plurality of applications. In addition, the plurality of mobile devices may be associated with users that share a set of the same characteristics such as demographic characteristics.

The distributed representations associated with a given mobile device may be collected over a period of time. A distributed representation may include a feature vector having values corresponding to a plurality of features. For example, the plurality of features may include a plurality of actions such as those described herein.

A prediction model may be generated by a mobile device and/or remotely located server. For example, a remotely located server may generate and store a plurality of prediction models, where each of the prediction models is associated with a corresponding one of a plurality of mobile devices. The data used to generate the prediction model for a mobile device may be stored locally at the mobile device and/or remotely at a storage device or remotely located server.

Once generated, the prediction model may be applied to the current context including the distributed representation to generate a probability associated with each of a plurality of applications installed on the mobile device. The plurality of applications may be ranked based, at least in part, upon the corresponding probabilities. One or more of the plurality of applications may be selected based, at least in part, upon the corresponding probabilities. In this manner, the prediction model may identify one or more of the plurality of applications installed on the mobile device as having a highest probability of being used next by the user of the mobile device.

In one embodiment, the prediction model may generate a matrix for the plurality of applications, where the matrix includes probabilities associated with each one of a plurality of possible distributed representations (which may correspond to all possible patterns of distributed representations) with respect to each of the plurality of applications. More particularly, each one of a plurality of rows (or columns) in the matrix may correspond to a corresponding one of the plurality of distributed representations, where the row (or column) includes a plurality of probabilities, where each one of the plurality of probabilities may indicate a probability that the user of the mobile device will next use a corresponding one of the plurality of applications. Conversely, each one of a plurality of columns (or rows) in the matrix may correspond to an application profile for a corresponding one of the plurality of applications, where the application profile indicates a plurality of probabilities, where each probability indicates a likelihood that a user of the mobile device will select the application from a corresponding one of a plurality of contexts (e.g., distributed representations). Thus, a row (or column) in the matrix corresponding to the distributed representation of the current context may be identified and probabilities associated with the applications installed on the mobile device may be ascertained. The plurality of applications may be ranked according to the corresponding probabilities and one or more of the plurality of applications having a highest probability may be identified.

The identified application(s) may be recommended, launched, or otherwise presented to the user of the mobile device. In one embodiment, an application that is determined to have a highest probability of being used next by the user of the mobile device may be launched such that content is presented to the user of the mobile device. For example, when a user picks up the mobile device and unlocks it, a homescreen application may open and present the application. In another embodiment, the application that is determined to have the highest probability of being used next by the user of the mobile device may be launched in the background as a silent process with an indication to the user that the application is available. In addition, a web page may be pre-loaded with content generated via the application.

The next application used by the user of the mobile device may be ascertained. The prediction model may be updated based, at least in part, upon the next application that is used by the user of the mobile device.

Implementing a Prediction Model Using a Bayesian Network

In accordance with various embodiments, a prediction model may be implemented using a Bayesian Network. More particularly, the Bayesian Network may be a parallel tree augmented naive Bayesian Network (PTAN). The prediction model may be deployed on parallel computing platforms such as Hadoop. PTAN is a parallel version of the Tree Augmented Naïve_Bayes (TAN), which has been proposed in order to remove the strong assumptions of independence in native Bayes and find correlations among attributes that are warranted by the training data. A discussion of Bayesian network classifiers can be found in Nir Friedman, Dan Geiger, and Moises Goldszmidt, *Bayesian network classifiers*, Machine learning 29 (1997), no. 2-3, 131-163, which is incorporated herein by reference for all purposes. The training data may correspond to a single mobile device or a plurality of mobile devices.

The training procedure of PTAN can be divided into two phases: (1) parallel structure training; and (2) parallel parameter estimation.

Constructing the Bayesian Network

The first phase is to learn_the structure of the Bayesian network. The procedure of constructing the PTAN Bayesian network from the training data may be performed as follows:

1. Based on the training data including a plurality of distributed representations (e.g., from a plurality of users), conditional mutual information between attributes may be computed for each one of a plurality of applications. The function of the conditional mutual information may be defined as follows:

$$I_p(x, y \mid a) = \sum_{x,y,a} P(x, y, a) \log \frac{P(x, y \mid a)}{P(x \mid a)P(y \mid a)},$$

where x and y may designate user attributes, a designates a particular application, and the training data corresponds to a plurality of mobile devices.

2. A complete undirected graph may be built in which the vertices correspond to the features, where a set of features corresponds to a distributed representation with respect to an application. A weight of an edge connecting feature $f_i$ to $f_j$ by $I_p(f_i, f_j \mid a)$ may be annotated such that the weight indicates a probability of occurrence.

3. A maximum weighted spanning tree may be built for the complete undirected graph. The maximum spanning tree problem can be transformed to a minimum spanning tree problem simply by negating edge weights, as discussed in David Eppstein, *Spanning trees and spanners*, Handbook of computational geometry (1999), 425-461, which is incorporated herein by reference for all purposes. Kruskal's algorithm may be used to solve the minimum spanning tree problem, as described in John C Gower and GJS Ross, *Minimum spanning trees and single linkage cluster analysis*, Applied statistics (1969), 54-64, which is incorporated herein by reference for all purposes.

4. The resulting undirected spanning tree may be transformed to a directed spanning tree by choosing a root variable and setting the direction of all edges to be outward from it. A TAN model may be constructed by adding a vertex labeled by adding an application variable a and adding an arc from a to each feature fi, where each feature fi corresponds to an action of a distributed representation.

The highest computational cost is associated with the first and the third step in the above algorithm. If we assume there exist N training instances and each instance has n features then the first step has complexity of $O(n^2N)$. The third step has a complexity of $O(n^2 \log n)$. $N \gg \log n$, step 1 is the bottleneck of building the Bayesian network structure. Hence, in PTAN, we can parallelize step 1 using MapReduce. More particularly, a Mapper may be implemented for parallelizing step 1, while a Reducer can be straightforwardly developed by aggregating the values based on keys, which may correspond to application-distributed representation combinations. An example algorithm for implementing a TAN structure learning mapper is shown in FIG. 4, while an example TAN parameter learning mapper is shown in FIG. 5.

After the PTAN structure is obtained, we can estimate the conditional probability for each individual user. The conditional probability may be estimated as follows:

$$P(f_i = k \mid pa(f_i) = j) = \frac{N_{ijk} + N'_{ijk}}{N_{ij} + N'_{ij}},$$

where fi is the feature, $pa(f_i)$ is the set of the parents of $f_i$ and $N'_{ijk}$ is a smoothing parameter that can be set, which may be 0.5 by default. The smoothing operation may enhance the prediction performance.

When a user has very few training instances for an application, the estimate of the conditional probability is unreliable. However, this problem is not present in the case of a naive Bayesian classifier where the training data corresponds to a plurality of mobile devices, since the Bayesian classifier may partition the data according to one or more class variables. Generally, all possible values of the class variables are adequately represented in training data associated with a plurality of mobile devices. Therefore, the estimated conditional probabilities are unlikely to be unreliable for a given class of users.

We can compute the probability that a user u is going to use mobile app aui when the user finds him/herself within the context $C=\{f_1; f_2; : : : ; f_n\}$ as follows:

$$P(a_{ui} \mid f_1, f_2, \ldots, f_n) \propto P(a_{ui})P(f_1, f_2, \ldots, f_n \mid a_{ui}) =$$

$$P(a_{ui}) \prod_{i=1}^{n} P(f_i \mid pa(f_i))$$

where $f_i$ represents the feature vectors.

One or more applications that have the highest probability may be identified as the prediction result. The identified applications may be recommended or launched, as described above.

Cold Start Situations

Two of the main challenges we face when applications are deployed in real-life environments include the Application Cold Start and the User Cold Start. The Application Cold Start may occur when a user installs a new application on his or her mobile device. Where the user has not yet opened the new application to use the application, contextual information pertaining to the new application will be unavailable. Alternatively, the user may have opened the new application a limited number of times. As a result, a minimum threshold amount of contextual information may be unavailable for use in training a prediction model. The User Cold Start may occur when contextual information pertaining to applications installed on the mobile device is not available. This may occur after a user installs a homescreen application and opens the homescreen application for the first time. Example methods of handling these two cold start problems will be described in further detail below.

Application Cold Start

For a newly installed application $a_i$ on a particular mobile device, contextual information pertaining to the application may be unavailable or limited for the mobile device. Thus, an adequate amount of user-specific information may be unavailable for the application. As a result, the probability of opening the application on the mobile device cannot be ascertained solely based on the contextual information.

In accordance with various embodiments, the probability of opening the application on the mobile device may be determined based, at least in part, upon information associated with other mobile devices on which the application is installed, as will be described in further detail below. In this manner, the probability that a user of the mobile device will use a newly installed application under a given context C may be estimated.

Generally, a fraction of the newly installed applications on a mobile device will be used a larger number of times and more frequently in the first several hours or days after installation of those applications on a mobile device, and then are used significantly fewer times and less frequently after the initial excitement of the newly installed applications dissipate.

In contrast, some newly installed applications are used frequently for a long-term period of time after their installation on a mobile device. In order to better estimate the probability that a user of the mobile device will next use a newly installed application under a given context C, the newly installed applications may be categorized.

In one embodiment, each of the newly installed applications may be categorized as a short-term application or a long-term application. More particularly, computer-readable instructions implementing Beta distribution may be used to model the temporal prominence of each newly installed application. In order to differentiate applications by their temporal significance, excess kurtosis can be utilized to evaluate the temporal peakedness of each application, as disclosed in Gamini Premaratne and Anil Bera, *Modeling asymmetry and excess kurtosis in stock return data*, Illinois Research & Reference Working Paper No. 00-123 (2000). The excess kurtosis ϱ percentage of a Beta distribution Beta(α, β) may be defined as follows:

$$\varrho = \frac{6[\alpha^3 - \alpha^2(\alpha\beta - 1) + \beta^2(\beta + 1) - 2\alpha\beta(\beta + 2)]}{\alpha\beta(\alpha + \beta + 2)(\alpha + \beta + 3)}.$$

An application with a high percentage value indicates that it is likely to be a short-term application, while an application with a low percentage value is likely to be a long-term application. In this manner, we can categorize the applications into short-term applications and long-term applications. For example, communication applications are usually long-term applications, while game applications tend to have short longevity.

Short-Term Application

Given the observations made above, in the case of applications that are classified as short-term, the probability that a user of the mobile device will use a short-term application may be assigned a probability determined based, at least in part, upon information associated with a plurality of other mobile devices. For example, the probability may be determined based, at least in part, upon the average opening frequency of the short-term application by a plurality of other mobile devices. The average opening frequency may be obtained from historical data obtained from profiles associated with the plurality of other mobile devices. Such mobile devices may be associated with a class of mobile devices, as described herein.

After a period of time such as a fixed time period (e.g., several hours), the probability determined based upon information associated with the other mobile devices may be replaced with a new probability determined based upon actual usage of the application by a user of the mobile device.

Long-Term Application

For long-term applications, the concept of "wisdom of the crowd" may be exploited. When an application $a_i$ has received many openings on a mobile device, that data may be considered more "reliable". However, when an application has received very few openings on the mobile device, the probability that a user of the mobile device will open the application $P(a_i)$ may be determined based, at least in part, upon information associated with a plurality of other mobile devices. For example, the information may indicate the average probability of opening the application $a_i$ on the plurality of other mobile devices.

In addition, the probability that a user of the mobile device will open the application $P(a_i)$ may be determined based, at least in part, upon information associated with the mobile device. For example, the information may indicate the number of openings of the application $a_i$ on the mobile device and/or the number of openings of all applications installed on the mobile device. More particularly, the probability that a user of the mobile device will open the application $P(a_i)$ may be determined based, at least in part, on the average probability of opening the application $a_i$ on a plurality of other mobile devices, the number of openings of the application $a_i$ on the mobile device, and the number of openings of all applications installed on the mobile device.

In one embodiment, a Bayesian average [1] may be used to effectively blend actual usage information pertaining to the application for a user of the mobile device with information pertaining to the application for users u of other mobile devices having the application installed thereon. The Bayesian average may be calculated as disclosed in George EP Box and George C Tiao, *Bayesian inference in statistical analysis*, vol. 40, John Wiley & Sons, 2011, which is incorporated by reference for all purposes.

In one embodiment, an equation for calculating the estimated probability of use of the application by a user of the mobile device may be approximated as follows:

$$P(a_{ui}) = \frac{C \cdot m_{a_{ui}} + O_{a_i}}{C + O}$$

where $Oa_i$ is the number of openings of the application $a_i$ on the mobile device, $Oa_i$ is the sum of all application openings on the mobile device, and $ma_i$ is the average probability of opening the application $a_i$ on a plurality of other mobile devices. C may represent a constant whose value is set to match the expected variation between data sets containing the historical data associated with different mobile devices.

The value of the estimated probability P for an application with a relatively small number of open events tends to be closer to the average opening probability of that same application on all other mobile devices. The more openings an application has received, the more accurate the probability estimation is. On the other hand, when an application has received just a relatively small number of openings, its estimated probability value is close to the application's unweighted average opening probability computed on the plurality of other mobile devices.

User Cold Start

In some instances, data pertaining to application usage of applications installed on a given mobile device may be unavailable. This may occur, for example, when the user purchases a new mobile device or the user has recently installed a homescreen application. In such instances, a prediction model associated with another set of one or more mobile devices/users may be used and/or adapted. The prediction model may be generated based upon historical data associated with one or more other mobile devices (or corresponding users) that are separate from the mobile device. More particularly, the users of the other mobile devices may share a set of characteristics with the user of the mobile device, such as demographic characterisics. In addition, the other mobile devices may all have applications installed thereon that include the plurality of applications that are installed on the mobile device (or a significant portion of the plurality of applications).

Two different strategies to attack the user cold start problem will be discussed below. These two different strategies are the Most Similar User Strategy and the Pseudo User Strategy.

Most Similar User Strategy

"The most similar user" may be identified based, at least in part, by identifying at least one user of at least a subset of other mobile devices based, at least upon characteristics of users of the other mobile devices (and characteristics of the user of the mobile device). A similarity between the user of the mobile device and users of the identified other mobile devices may be ascertained by using metrics such as, for instance, Jaccard similarity between the user of the mobile device and users of the other mobile devices.

After the most similar user has been found we can use the computer-generated model associated with the most similar user's mobile device to predict the behavior of the user of the mobile device. This strategy, though, has a very important drawback. The user that has been found to be the most similar may have an application inventory that is very different from the applications installed on the mobile device of the user. In some extreme cases the application inventory of the mobile device of the user may be totally different from the applications installed on mobile devices of other "known" users. As a result, the most similar user strategy would not have any advantage over a purely random strategy. Of course, it is possible to place a threshold on the minimum acceptable similarity between the user of the mobile device and the "most similar user." However, while such a threshold would improve the average accuracy of the method, it would also limit the coverage, i.e., the number of users/mobile devices for which probabilities can be generated.

When a user installs a homescreen application such as Aviate on his or her mobile device, it is not true that we do not know anything about the user. For example, it is possible to identify the applications that are installed on the user's mobile device. Thus, it may be desirable to identify the "most similar user" at least in part by identifying other mobile devices that also have applications installed thereon that include the applications that are installed on the user's mobile device (or at least a significant portion of these applications).

In one embodiment, the "most similar user" may be identified from users of other mobile devices having applications installed thereon that include the applications installed on the mobile device (or a significant portion of the plurality of applications). A computer-generated model associated with the other mobile device of this "most similar user" may then be applied to estimate a probability of use of one of the applications installed on the mobile device by the user of the mobile device.

Pseudo User Strategy

In order to solve the problem of the strategy presented above, the Pseudo User Strategy may be applied. The Pseudo User Strategy may include obtaining historical data associated with one or more other mobile devices, which may in turn be used to train a computer-generated model (e.g., PTAN model) for predicting behavior of the user of the mobile device. Such historical data may be referred to as a "pseudo history."

Let us assume there are k users $U=\{u_1, u_2, u_3, \ldots, u_k\}$, and let us further assume that each user u has an application inventory L. When a new user with application inventory $I_{new}$ installs a homescreen application, we can find a subset of users U' satisfying the following conditions:

$$\min \sum_{n \in U'} |c(u)|,$$

s.t.

-continued $$\bigcup_{u \in U'} I_u = I_{new}$$

The cost of a user c(u) may be defined as the inverse of its similarity to the current user, i.e., $c(u)=1/J(I_{new}, I_u)$. The logic behind the problem formation is that we want to find a small number of similar users whose application inventories cover all of the application in the inventory of the user of the mobile device. It is straightforward to prove that the problem is NP-hard (it is essentially a weighted set-covering problem) and an example of the greedy algorithm that may be used to generate the pseudo user is presented below, which has an approximation ratio of O(log|U|).

---

1: U ← ∅
2: I ← ∅
3: repeat
4: choose $u \in \mathcal{U}$ minimizing $\frac{c(u)}{|I \cup I_u - I|}$
5: let U ← U ∪ u
6: let I ← I ∪ $I_u$
7: until I = $I_{new}$

---

Example Methods of Implementing Personalized Application Prediction

Figure 6:
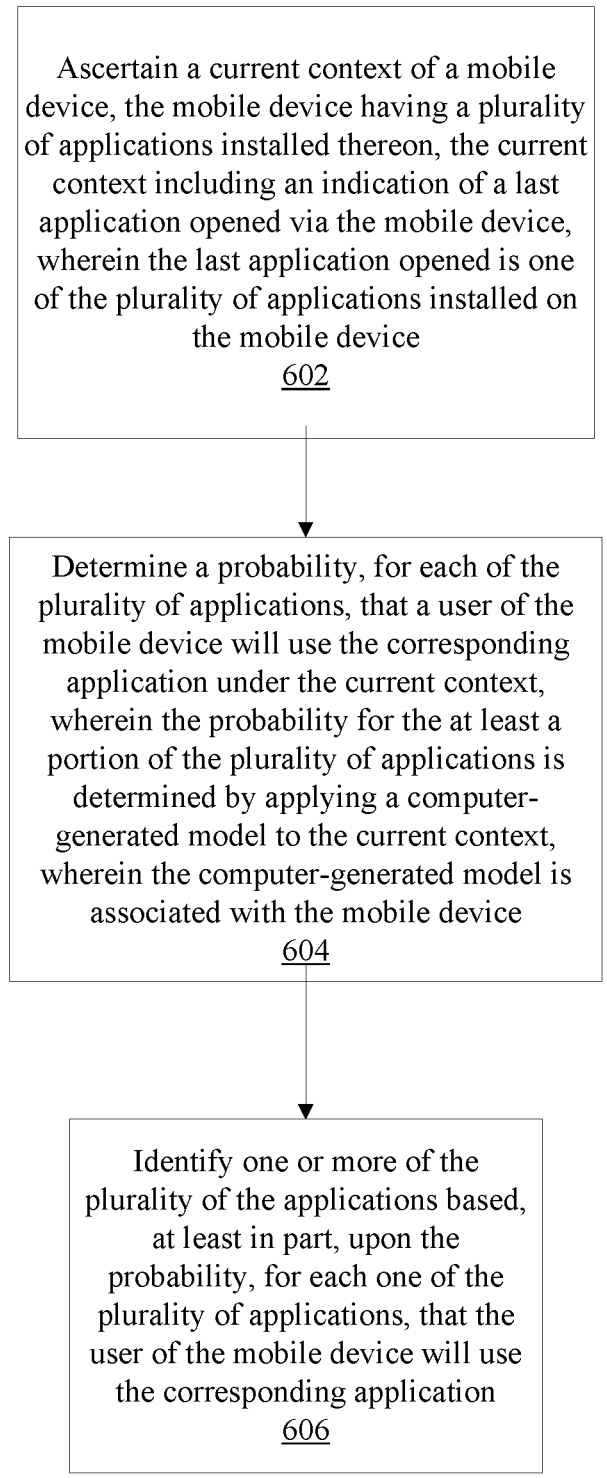
FIG. 6 is a process flow diagram illustrating an example method of performing personalized application prediction in accordance with various embodiments.

FIG. 6 is a process flow diagram illustrating an example method of performing personalized application prediction in accordance with various embodiments. A current context of a mobile device may be ascertained at 602, where the current context includes an indication of a last application opened via the mobile device, wherein the last application opened is one of a plurality of applications installed on the mobile device. The current context may further indicate a value associated with one or more of a Last Location Update, Last Charge Cable, Last Audio Cable, Last Context Trigger, or a Last Context Pulled.

A probability may be determined at 604, for each of the plurality of applications, that a user of the mobile device will use the corresponding application under the current context. The probability for at least a portion of the plurality of applications may be determined by applying a computer-generated model associated with the mobile device to the current context. However, contextual information may not be available (or alternatively, may be limited) for some or all of the applications installed on the mobile device. For example, contextual information associated with newly installed applications may be unavailable or limited. The probability associated with these newly installed applications may be determined using another mechanism, as described herein.

The computer-generated model may be trained using data associated with the mobile device. More particularly, contextual information may be collected via the mobile device and the computer-generated model associated with the mobile device may be trained using at least a portion of the collected contextual information. The contextual information may include a context pertaining to one or more actions detected via the mobile device. The context may indicate a sequential pattern of actions detected by the mobile device prior to one of the one or more actions and/or after the one of the one or more actions. At least one of the actions may pertain to usage of at least a portion of the plurality of applications installed on the mobile device. For example, the actions may include an application open action. In addition, the actions may further include a location update action, a charge cable action, an audio cable action, a context trigger action, and/or a context pulled action.

As described above, it may be determined whether any of the plurality of applications installed on the mobile device is a newly installed application. In some instances, it may be determined that a particular one of the plurality of applications is a newly installed application such that contextual information pertaining to usage of the newly installed application on the mobile device cannot be ascertained (or may be limited). Such a scenario may also be referred to as an application cold start. In an application cold start situation, it may be further determined whether the newly installed application is a short-term application or a long-term application. The probability that a user of the mobile device will use the newly installed application may be ascertained based, at least in part, upon whether the newly installed application is a short-term application or a long-term application.

Upon determining that the particular application, which is a newly installed application, is a short-term application, the probability that a user of the mobile device will use the newly installed application may be ascertained based, at least in part, upon information associated with other mobile devices, such as those associated with a class of mobile devices. For example, the class of mobile devices may include other mobile devices having applications installed thereon that include the plurality of applications. The class of mobile devices may also be associated with users sharing a set of characteristics such as demographic characteristics. In one embodiment, the information may include historical data pertaining to a plurality of other mobile devices with respect to the application. For example, the historical data may indicate a frequency with which the application is opened by the plurality of other mobile devices. In this manner, the probability that a user of the mobile device will use the short-term application may be estimated. After a period of time such as a fixed time period (e.g., several hours), the probability determined based upon information associated with the other mobile devices may be replaced with a new probability determined based upon actual usage of the application by a user of the mobile device.

Upon determining that the particular application, which is a newly installed application, is a long-term application, the probability that a user of the mobile device will use the newly installed application may be ascertained based, at least in part, upon information associated with other mobile devices, such as those associated with a class of mobile devices. For example, the class of mobile devices may include other mobile devices having applications installed thereon that include the plurality of applications. The class of mobile devices may also be associated with users sharing a set of characteristics such as demographic characteristics. In one embodiment, the information may include historical data associated with a plurality of other mobile devices with respect to the newly installed application. For example, the historical data may indicate an average opening probability of the particular application on the other mobile devices. The historical data may also include that pertaining to the plurality of applications installed on the mobile device. For example, the historical data may indicate a number of openings of the newly installed application on the mobile device and/or a number of openings of the plurality of applications on the mobile device.

One or more of the plurality of the applications may be identified at 606 based, at least in part, upon the probability, for each one of the plurality of applications, that the user of the mobile device will use the corresponding application. Once identified, the identified application(s) may be recommended or launched via the mobile device. In addition, an advertisement pertaining to the identified application(s) may be provided via the mobile device.

Figure 7:
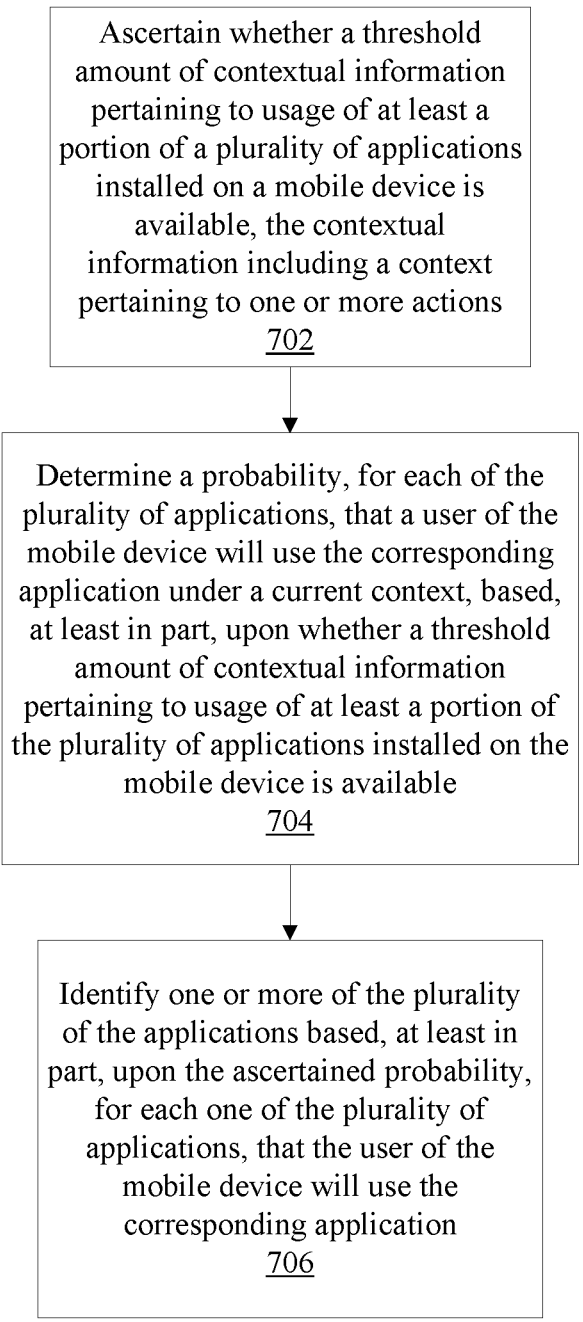
FIG. 7 is a process flow diagram illustrating another example method of performing personalized application prediction in accordance with various embodiments.

FIG. 7 is a process flow diagram illustrating another example method of performing personalized application prediction in accordance with various embodiments. It may be ascertained at 702 whether a threshold amount of contextual information pertaining to usage of at least a portion of a plurality of applications installed on a mobile device is available, where the contextual information includes a context pertaining to one or more actions. For example, contextual information for a newly installed application may be unavailable or limited. As another example, where the user is a new user (e.g., a homescreen application has recently been installed), contextual information may be unavailable or limited for one or more of the plurality of applications.

The context may include an indication of a sequential pattern of actions detected by the mobile device prior to one of the one or more actions and/or after the one of the one or more actions. At least one of the actions may pertain to usage of at least a portion of the plurality of applications installed on the mobile device. For example, the actions may include an application open action. In addition, the actions may further include a location update action, a charge cable action, an audio cable action, a context trigger action, and/or or a context pulled action.

For each of the plurality of applications installed on the mobile device, a probability may be determined at 704 that a user of the mobile device will use the corresponding application under a current context based, at least in part, upon whether a threshold amount of contextual information pertaining to usage of at least a portion of the plurality of applications installed on the mobile device is available.

It may be ascertained that contextual information pertaining to usage of at least a portion of the plurality of applications installed on the mobile device is available. For an application for which contextual information is available (e.g., the user has previously opened the application), the probability that a user of the mobile device will use that application may be determined by applying a computer-generated model associated with the mobile device to the contextual information.

Alternatively, it may be ascertained that contextual information pertaining to usage of at least a portion of the plurality of applications installed on the mobile device is not available. Such a scenario may be referred to as a user cold start. Thus, the probability, for each of the plurality of applications, that a user of the mobile device will use the corresponding application, may be determined based, at least in part, upon information associated with one or more other mobile devices, such as those associated with a class of mobile devices. In one embodiment, the information may be obtained via a computer-generated model associated with the other mobile devices. The computer-generated model may subsequently be updated or replaced based upon actions recorded via the mobile device. In another embodiment, the information may include historical data, as described above. The class of mobile devices may include other mobile devices having applications installed thereon that include the plurality of applications. The class of mobile devices may also be associated with users sharing a set of characteristics such as demographic characteristics with a user of the mobile device.

In other scenarios, it may be ascertained that contextual information pertaining to usage of an application does not exist or is limited, but it does exist for other application(s). Such a scenario may be referred to as an application cold start. In an application cold start situation, it may be determined whether the application (e.g., newly installed application) is a short-term application or a long-term application. In an application cold start situation, it may be further determined whether the newly installed application is a short-term application or a long-term application. The probability that a user of the mobile device will use the newly installed application may be ascertained based, at least in part, upon whether the newly installed application is a short-term application or a long-term application.

As described above, the probability that a user of the mobile device will use a newly installed application may be ascertained based, at least in part, upon information associated with a plurality of other mobile devices, such as those associated with a class of mobile devices. For example, the class of mobile devices may include other mobile devices having applications installed thereon that include the plurality of applications. The class of mobile devices may also be associated with users sharing a set of characteristics such as demographic characteristics with a user of the mobile node.

Where a newly installed application is determined to be a short-term application, the information may include historical data pertaining to a plurality of other mobile devices with respect to the application. For example, the historical data may indicate a frequency with which the application is opened by the plurality of other mobile devices. In this manner, the probability that a user of the mobile device will use the short-term application may be estimated. After a period of time such as a fixed time period (e.g., several hours), the probability determined based upon information associated with the other mobile devices may be replaced with a new probability determined based upon actual usage of the application by a user of the mobile device.

Alternatively, where the newly installed application is determined to be a long-term application, the information may include historical data pertaining to a plurality of other mobile devices with respect to the application. For example, the historical data may indicate an average opening probability of the particular application on the other mobile devices. The information may also include historical data pertaining to usage of the plurality of applications installed on the mobile device. For example, the historical data may indicate a number of openings of the newly installed application on the mobile device and/or a number of openings of the plurality of applications on the mobile device.

One or more of the plurality of the applications may be identified at 706 based, at least in part, upon the ascertained probability, for each one of the plurality of applications, that the user of the mobile device will use the corresponding application. Once identified, the identified application(s) may be recommended or launched via the mobile device. In addition, an advertisement pertaining to the identified application(s) may be provided via the mobile device.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Network Architecture

Figure 8:
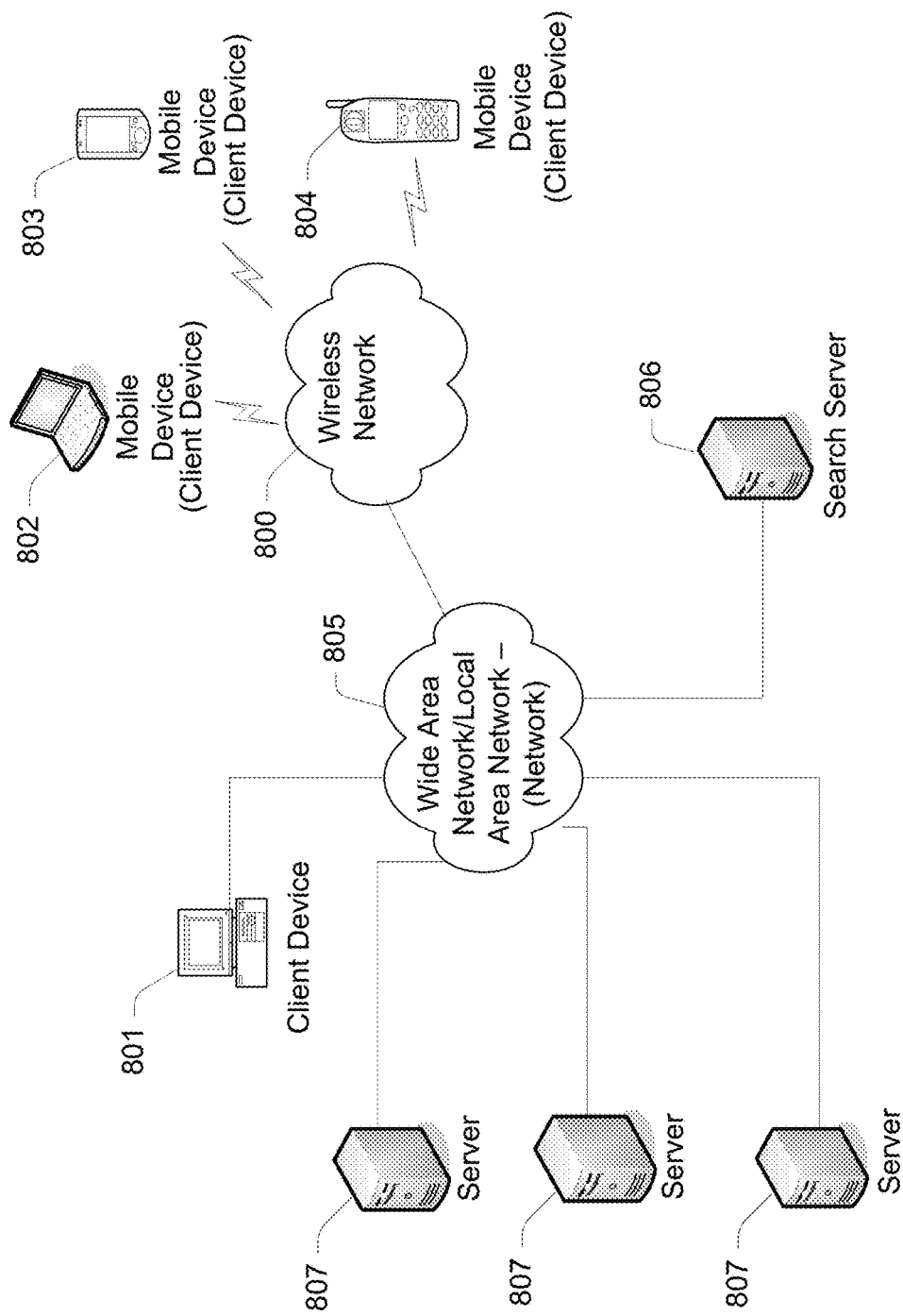
FIG. 8 is a schematic diagram illustrating an example embodiment of a network in which various embodiments may be implemented.

The disclosed embodiments may be implemented in any of a wide variety of computing contexts. FIG. 8 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 8, for example, includes a variety of networks, such as a LAN/WAN 705 and wireless network 800, a variety of devices, such as client devices 801-804, and a variety of servers such as content server(s) 807 and search server 806. The servers may also include an ad server (not shown). As shown in this example, the client devices 801-804 may include one or more mobile devices 802, 803, 804. Client device(s) 801-804 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 8 by server(s) 807, which may correspond to multiple distributed devices and data store(s). The server(s) 807 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 9:
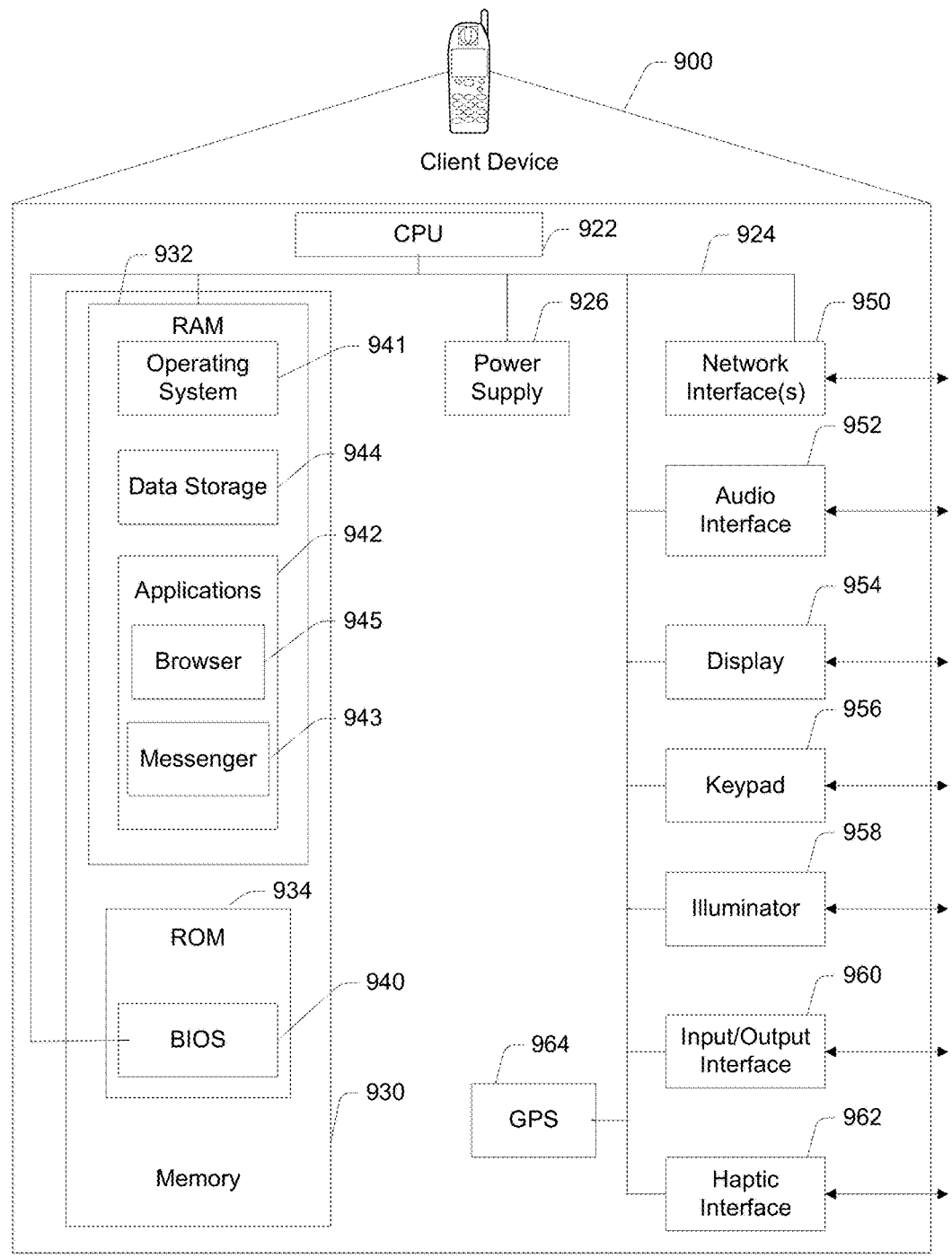
FIG. 9 is a schematic diagram illustrating an example client device in which various embodiments may be implemented.

FIG. 9 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Figure 10:
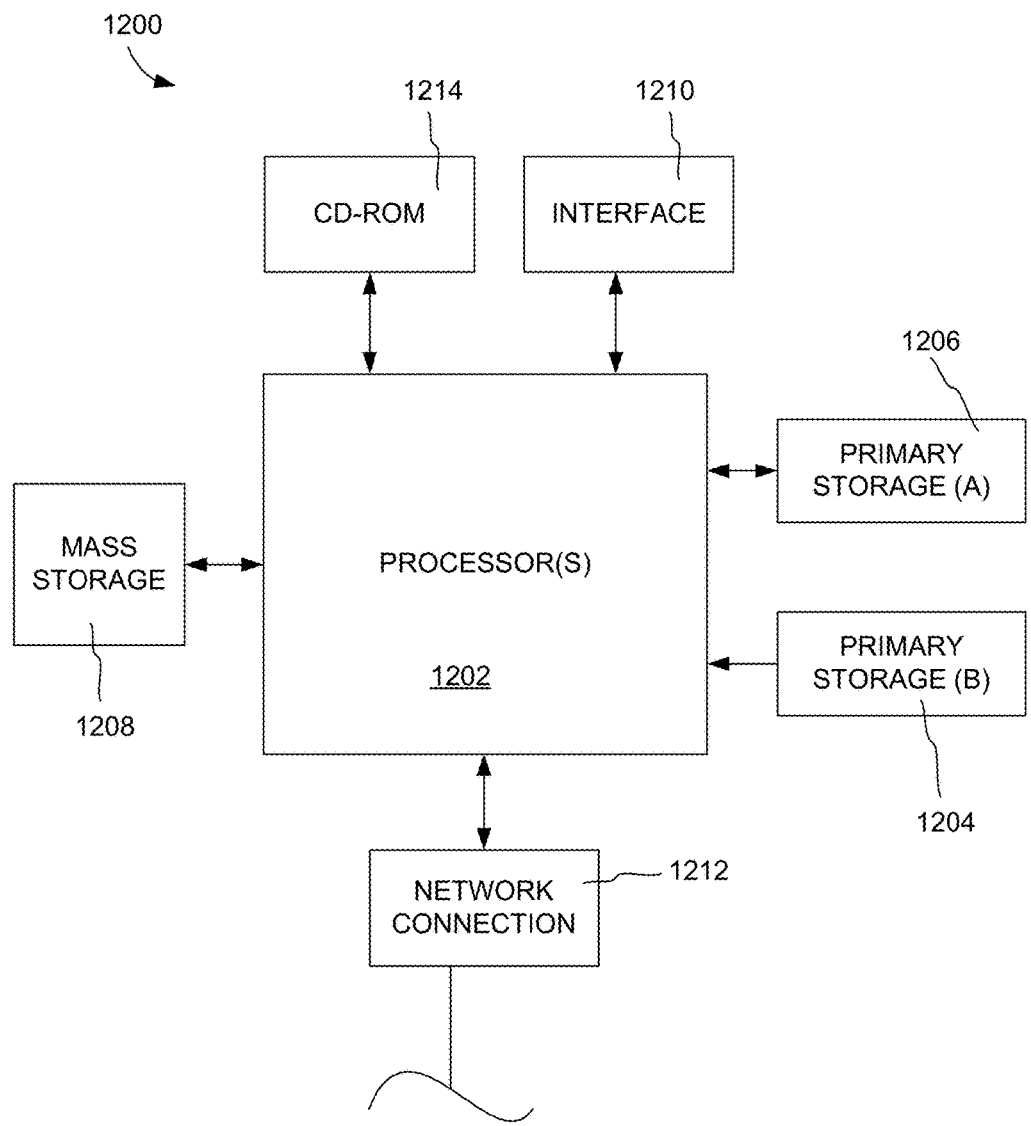
FIG. 10 is a schematic diagram illustrating an example computer system in which various embodiments may be implemented.

FIG. 10 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    ascertaining a current context of a mobile device, the current context including an indication of a last application opened via the mobile device, wherein the last application opened is one of a plurality of applications installed on the mobile device;
    determining a probability, for each of the plurality of applications, that a user of the mobile device will use the corresponding application under the current context, wherein the probability for at least a portion of the plurality of applications is determined by applying a computer-generated model to the current context, wherein the computer-generated model is associated with the mobile device;
    identifying one or more of the plurality of the applications based, at least in part, upon the probability, for each one of the plurality of applications, that the user of the mobile device will use the corresponding application; and
    determining that a particular one of the plurality of applications is a newly installed application;
    wherein determining a probability, for each of the plurality of applications, that a user of the mobile device will use the corresponding application includes ascertaining a probability that a user of the mobile device will use the newly installed application based, at least in part, upon information pertaining to at least one other mobile device.

2. The method as recited in claim 1, further comprising:
    recommending the identified one or more of the plurality of applications, launching the identified one or more of the plurality of applications, or providing an advertisement pertaining to the identified one or more of the plurality of applications.

3. The method as recited in claim 1, wherein the current context further comprises a value associated with one or more of a Last Location Update, Last Charge Cable, Last Audio Cable, Last Context Trigger, or a Last Context Pulled.

4. The method as recited in claim 1, further comprising:
    collecting contextual information via the mobile device, the contextual information including a context pertaining to one or more actions detected via the mobile device, wherein at least one of the one or more actions pertains to usage of the at least a portion of the plurality of applications installed on the mobile device; and
    training the computer-generated model associated with the mobile device using at least a portion of the collected contextual information.

5. The method as recited in claim 4, wherein the one or more actions comprise at least one of an application open action, a location update action, a charge cable action, an audio cable action, a context trigger action, or a context pulled action.

6. The method as recited in claim 4, wherein the context indicates a sequential pattern of actions detected by the mobile device prior to one of the one or more actions and/or after the one of the one or more actions.

7. The method as recited in claim 1, further comprising:
    determining whether the newly installed application is a short-term application or a long-term application; and
    wherein determining a probability, for each of the plurality of applications, that a user of the mobile device will use the corresponding application includes ascertaining a probability that a user of the mobile device will use the newly installed application based, at least in part, upon whether the newly installed application is a short-term application or a long-term application.

8. The method as recited in claim 1, further comprising:
    determining that the newly installed application is a short-term application; and
    wherein determining a probability, for each of the plurality of applications, that a user of the mobile device will use the corresponding application includes ascertaining a probability that a user of the mobile device will use the newly installed application based, at least in part, upon historical data pertaining to a plurality of other mobile devices with respect to the particular one of the plurality of applications.

9. The method as recited in claim 1, further comprising:
    determining that the newly installed application is a long-term application; and
    wherein determining a probability, for each of the plurality of applications, that a user of the mobile device will use the corresponding application includes ascertaining a probability that a user of the mobile device will use the newly installed application based, at least in part, upon historical data, wherein the historical data indicates a number of openings of the plurality of applications on the mobile device and an average opening probability of the particular application on other mobile devices.

10. A method, comprising:
    ascertaining whether a threshold amount of contextual information pertaining to usage of at least a portion of a plurality of applications installed on a mobile device is available, the contextual information including a context pertaining to one or more actions detected via the mobile device;
    determining a probability, for each of the plurality of applications, that a user of the mobile device will use the corresponding application under a current context, based, at least in part, upon whether a threshold amount of contextual information pertaining to usage of at least a portion of the plurality of applications installed on the mobile device is available; and
    identifying one or more of the plurality of the applications based, at least in part, upon the ascertained probability, for each one of the plurality of applications, that the user of the mobile device will use the corresponding application.

11. The method as recited in claim 10, wherein ascertaining whether a threshold amount of contextual information pertaining to usage of at least a portion of a plurality of applications installed on a mobile device is available comprises ascertaining that a threshold amount of contextual information pertaining to usage of at least a portion of the plurality of applications installed on the mobile device is not available, and wherein determining a probability, for each of the plurality of applications, that a user of the mobile device will use the corresponding application, based, at least in part, upon whether a threshold amount of contextual information pertaining to usage of at least a portion of the plurality of applications installed on the mobile device is available comprises:

obtaining information associated with at least one other mobile device having applications installed thereon that include the plurality of applications, the information including historical data or the information being generated via at least one computer-generated model associated with the at least one other mobile device; and determining a probability, for each of the plurality of applications, based, at least in part, upon the information.

12. The method as recited in claim 10, wherein the one or more actions comprise at least one of an application open action, a location update action, a charge cable action, an audio cable action, a context trigger action, or a context pulled action.

13. The method as recited in claim 10, wherein the current context comprises one or more of a Last Location Update, Last Charge Cable, Last Audio Cable, Last Context Trigger, Last Context Pulled, or a Last Application Open for each application installed on the mobile device.

14. The method as recited in claim 10, further comprising:

determining that a particular one of the plurality of applications is a newly installed application such that contextual information pertaining to usage of the newly installed application on the mobile device cannot be ascertained or is limited; and determining whether the newly installed application is a short-term application or a long-term application;

wherein determining a probability, for each of the plurality of applications, that a user of the mobile device will use the corresponding application includes ascertaining a probability that a user of the mobile device will use the newly installed application based, at least in part, upon whether the newly installed application is a short-term application or a long-term application.

15. The method as recited in claim 10, further comprising:

determining that a particular one of the plurality of applications is a newly installed application such that contextual information pertaining to usage of the newly installed application on the mobile device cannot be ascertained or is limited; and determining that the newly installed application is a short-term application;

wherein determining a probability, for each of the plurality of applications, that a user of the mobile device will use the corresponding application includes ascertaining a probability that a user of the mobile device will use the newly installed application based, at least in part, upon historical data pertaining to a plurality of other mobile devices with respect to the particular one of the plurality of applications.

16. The method as recited in claim 10, further comprising:

determining that a particular one of the plurality of applications is a newly installed application such that contextual information pertaining to usage of the newly installed application on the mobile device cannot be ascertained or is limited; and determining that the newly installed application is a long-term application;

wherein determining a probability, for each of the plurality of applications, that a user of the mobile device will use the corresponding application includes ascertaining a probability that a user of the mobile device will use the newly installed application based, at least in part, upon historical data, wherein the historical data indicates a number of openings of the plurality of applications on the mobile device and an average opening probability of the particular application on other mobile devices.

17. The method as recited in claim 10, further comprising:

recommending the identified one or more of the plurality of applications or providing an advertisement pertaining to the identified one or more of the plurality of applications.

18. An apparatus, comprising:

a processor; and a memory storing thereon computer-readable instructions, the computer-readable instructions being configured to:

ascertain a current context of a mobile device, the current context including an indication of a last application opened via the mobile device, wherein the last application opened is one of a plurality of applications installed on the mobile device;

determine a probability, for each of the plurality of applications, that a user of the mobile device will use the corresponding application under the current context, wherein the probability for at least a portion of the plurality of applications is determined by applying a computer-generated model to the current context, wherein the computer-generated model is associated with the mobile device; and identify one or more of the plurality of the applications based, at least in part, upon the probability, for each one of the plurality of applications, that the user of the mobile device will use the corresponding application.

19. The apparatus as recited in claim 18, the computer-readable instructions being further configured to:

recommend the identified one or more of the plurality of applications, launch the identified one or more of the plurality of applications, or provide an advertisement pertaining to the identified one or more of the plurality of applications.

20. The apparatus as recited in claim 18, wherein the current context further comprises a value associated with one or more of a Last Location Update, Last Charge Cable, Last Audio Cable, Last Context Trigger, or a Last Context Pulled.

\* \* \* \* \*